United States Patent
Beaver

(10) Patent No.: US 11,217,226 B2
(45) Date of Patent: Jan. 4, 2022

(54) SYSTEM TO DETECT AND REDUCE UNDERSTANDING BIAS IN INTELLIGENT VIRTUAL ASSISTANTS

(71) Applicant: Verint Americas Inc., Alpharetta, GA (US)

(72) Inventor: Ian Beaver, Spokane, WA (US)

(73) Assignee: VERINT AMERICAS INC., Alpharetta, GA (US)

(*) Notice: Subject to any disclaimer, the term of this patent is extended or adjusted under 35 U.S.C. 154(b) by 125 days.

(21) Appl. No.: 16/667,022

(22) Filed: Oct. 29, 2019

(65) Prior Publication Data
US 2020/0143794 A1 May 7, 2020

Related U.S. Application Data

(60) Provisional application No. 62/752,668, filed on Oct. 30, 2018.

(51) Int. Cl.
| | |
|---|---|
| *G06F 40/20* | (2020.01) |
| *G10L 15/06* | (2013.01) |
| *G06F 17/16* | (2006.01) |
| *G10L 15/18* | (2013.01) |

(52) U.S. Cl.
CPC ............ *G10L 15/063* (2013.01); *G06F 17/16* (2013.01); *G06F 40/20* (2020.01); *G10L 15/18* (2013.01); *G10L 2015/0636* (2013.01)

(58) Field of Classification Search
CPC ........ G06N 3/006; G06N 20/10; G06N 5/003; G06N 20/00; G06N 3/08; G06N 5/022
USPC ................. 704/231–257, 270–275
See application file for complete search history.

(56) References Cited

U.S. PATENT DOCUMENTS

| | | | |
|---|---|---|---|
| 4,914,590 A | 4/1990 | Loatman et al. | |
| 9,460,713 B1* | 10/2016 | Mengibar | G10L 15/07 |
| 2004/0148154 A1 | 7/2004 | Acero et al. | |
| 2007/0143485 A1 | 6/2007 | Da Palma et al. | |
| 2011/0029303 A1* | 2/2011 | Mizuguchi | G06F 40/242 704/9 |
| 2014/0095147 A1 | 4/2014 | Hebert et al. | |
| 2014/0095426 A1* | 4/2014 | Nicholson | G06N 20/00 706/52 |
| 2014/0163959 A1 | 6/2014 | Hebert et al. | |
| 2016/0162779 A1* | 6/2016 | Marcus | G06N 20/10 706/12 |
| 2017/0048109 A1 | 2/2017 | Kant et al. | |
| 2018/0374482 A1 | 12/2018 | Woo et al. | |
| 2019/0087728 A1* | 3/2019 | Agarwal | G06F 16/2455 |
| 2019/0147371 A1* | 5/2019 | Deo | G06N 20/00 706/12 |
| 2020/0081865 A1* | 3/2020 | Farrar | G06K 9/6218 |

OTHER PUBLICATIONS

Buda et al. "A systematic study of the class imbalance problem in convolutional neural networks". Neural Networks 106 (2018) 259-259 (Year: 2018).*
Bolukbasi et al. "Man is to Computer Programmer as Woman is to Homemaker? Debiasing Word Embeddings". arXiv: 1607.06520v1 [cs.CL] Jul. 21, 2016 (Year: 2016).*
Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.
Brill, E., "Transformation-Based Error-Driven Learning and Natural Language Processing: A Case Study in Part-of-Speech Tagging," Association for Computational Linguistics, 1995, 24 pages.
Dumoulin, J., "Using Multiple Classifiers to Improve Intent Recognition in Human Chats," MAICS, 2014, 6 pages.
Kim, Y-B., et al., "*Onenet*: Joint Domain, Intent, Slot Prediction for Spoken Language Understanding," IEEE Automatic Speech Recognition and Understanding Workshop (ASRU), 2017, 7 pages.
Kim, B., et al., "Two-stage multi-intent detection for spoken language understanding," Multimedia Tools and Applications, 2016, 14 pages.
Kuhn, R., et al., "The Application of Semantic Classification Trees to Natural Language Understanding," IEEE Transactions on Pattern Analysis and Machine Intelligence, vol. 17, No. 5, 1995, pp. 449-460.
Lison, P., "Structured Probabilistic Modelling for Dialogue Management," Ph.D. Thesis, Department of Informatics, Faculty of Mathematics and Natural Sciences, University of Oslo, Oct. 30, 2013, 250 pages.
Ratnaparkhi, A., "A Maximum Entropy Model for Part-of-Speech Tagging," Conference on Empirical Methods in Natural Language Processing (EMNLP), 1996, 10 pages.
Search Report, dated Mar. 25, 2020, received in connection with EP Patent Application No. 19206254.5.

* cited by examiner

*Primary Examiner* — Jesse S Pullias
(74) *Attorney, Agent, or Firm* — Meunier Carlin & Curfman LLC

(57) ABSTRACT

Disclosed is a system and method for detecting and addressing bias in training data prior to building language models based on the training data. Accordingly system and method, detect bias in training data for Intelligent Virtual Assistant (IVA) understanding and highlight any found. Suggestions for reducing or eliminating them may be provided This detection may be done for each model within the Natural Language Understanding (NLU) component. For example, the language model, as well as any sentiment or other metadata models used by the NLU, can introduce understanding bias. For each model deployed, training data is automatically analyzed for bias and corrections suggested.

20 Claims, No Drawings

SYSTEM TO DETECT AND REDUCE UNDERSTANDING BIAS IN INTELLIGENT VIRTUAL ASSISTANTS

CROSS REFERENCE TO RELATED APPLICATIONS

This application is a non-provisional patent application claiming priority to Provisional Patent Application Ser. No. 62/752,668 filed Oct. 30, 2018, which is hereby incorporated by this reference in its entirety as if fully set forth herein.

BACKGROUND

Field

Embodiments of the present invention relate to detecting bias in language models, specifically to system and methods for automatically detecting bias in language model data.

Background

Intelligent Virtual Assistants (IVAs) and chatterbots can be implemented in a multitude of ways, but common to all is a component for Natural Language Understanding (NLU), which is used for the translation of user inputs into a semantic representation [1, 2, 3]. Regardless of the means in which the user is interacting with the IVA (keyboard, speech, gestures, etc.), the user input is first converted into text or a numerical feature representation and fed into the NLU for analysis. The NLU maps user inputs, or conversational turns, to a derived semantic representation commonly known as the user intention or simply intent. In the context of Natural Language Processing, intent is an interpretation of a statement or question that allows one to formulate the 'best' response to the statement. The collection syntax, semantics, and grammar rules that defines how input language maps to an intent within the NLU is referred to as a language model. The language model may include unintended biases based on how the language maps to the intent.

BRIEF SUMMARY OF THE DISCLOSURE

Accordingly, the present invention is directed to a system and a method to detect and reduce understanding bias in intelligent virtual assistants that obviates one or more of the problems due to limitations and disadvantages of the related art.

In accordance with the purpose(s) of this invention, as embodied and broadly described herein, this invention, in one aspect, relates to A computer product comprising computer executable code embodied in a non-transitory computer readable medium that, when executing on one or more computing devices performs a method of automatically detecting bias in training data for training a language model. The method comprises digitally processing training data to identify if the training data comprises a type of bias; and wherein, if the training data comprises bias, adjusting the training data to compensate for the type of bias identified.

In another aspect, the invention relates to a method of automatically detecting bias in training data for training a language model. The method comprises digitally processing training data to identify if the training data comprises a type of bias; and wherein, if the training data comprises bias, adjusting the training data to compensate for the type of bias identified.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the system and method to detect and reduce understanding bias in intelligent virtual assistants, as well as the structure and operation of the various embodiments of the system to detect and reduce understanding bias in intelligent virtual assistants, are described in detail below with reference to the accompanying drawings.

It is to be understood that both the foregoing general description and the following detailed description are exemplary and explanatory only, and are not restrictive of the invention as claimed.

DETAILED DESCRIPTION

Reference will now be made in detail to embodiments of the system to detect and reduce understanding bias in intelligent virtual assistants with reference to the accompanying FIGURES The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The NLU may perform pre-processing steps such as part-of-speech tagging, stemming, and entity identification (such as proper names or dates) before feeding the text into the language model. Each of these parsers may be trained through machine learning methods or manually constructed by human experts.

Intent detection for language understanding is considered a multi-class classification problem. One or more intents (classes) may be present in a given user input. The language model is applied to the pre-processed input text and all present intents are returned, potentially with associated scores such as confidence or probability.

There are two primary ways to construct the language model. The first uses human-curated methods such as regular expressions or grammars to define the structure and content of language associated to a particular intent. By applying these patterns or grammars to the input text, the correct intent can be determined. The intent associated with the matching grammar or pattern is selected in cases where there is no ambiguity. If multiple patterns match, the correct intent may be selected by a scoring mechanism applied to all patterns that match or other means such as ontological methods.

The second way to construct a language model is through statistical means. Text that is similar to the expected input text is labeled by humans to be associated with particular intentions. This labeled data is then used to train a model of the distribution of input text over the known intentions using various machine learning approaches. Common approaches include Support Vector Machines, Neural Networks, and Decision Trees.

When constructing language models using statistical methods, there is a danger in introducing bias in the understanding of the IVA by using training data containing biased correlations. For example, there may be many training samples containing associations between senior travel and assistance to the gate in an airline domain. Samples and their labels may look like Table 1.

TABLE 1

| Training Text | Labeled Intents |
| --- | --- |
| My elderly father needs assistance to the gate | Senior_Travel, Boarding Assistance |
| I am a senior and I need a wheelchair. Do you provide them? | Senior_Travel, Boarding_Assistance |
| Where do I go to get my luggage? | Baggage_Claim |

Suppose that the intent of Senior Travel does not occur without the presence of the intent Boarding Assistance within the training data. This will make the natural language understanding model associate a one-to-one relationship between Senior Travel and Boarding Assistance. So every time one intent is detected, such as Boarding Assistance in the example "I need help getting onboard," the model will assume the other is present as well. In this example the IVA will assume the user is a senior citizen because they need boarding assistance, which may be unacceptable bias.

Another way that bias can affect the understanding of an IVA is when determining user attributes or meta data about the current conversation. One such attribute might be user sentiment or tone. For example, if the IVA was given an overabundance of training data where sentiment polarity was negative (as is common in some customer service domains) the IVA may be more likely to label the user as upset when in reality they are not. Examples of meta data bias may be in the determination of higher level topic or reason for contacting the IVA, user preferences such as seat selection for airline travel or entertainment preferences such as women may be associated to prefer love stories.

Accordingly, we present a system and method to detect bias in training data for IVA understanding and highlight any found, as well as provide suggestions to reduce or eliminate them. This detection may be done for each model within the NLU component. For example, the language model, as well as any sentiment or other metadata models used by the NLU, can introduce understanding bias. For each model deployed, we look for bias in the training data and suggest a system and method to correct it.

According to principles described herein, when training a statistical model, the training data is first scanned by a bias scoring system, which looks for several types of bias to surface. Once surfaced, the system may suggest to the human why the bias exists based on the type of bias and give suggestions on how to reduce it if needed. The first type of bias that the system looks for is co-occurrence bias. This bias can only happen in multi-class classification tasks such as user intentions present in text or entertainment preferences (a person can like more than one genre for instance). This is type given in the Senior Travel and Boarding Assistance example in the previous section. To detect this, a co-occurrence matrix is constructed for all labels given in the classification task. Such a matrix is shown for the data in Table 2, below.

TABLE 2

| | Boarding_Assistance | Senior_Travel | Baggage_Claim |
| --- | --- | --- | --- |
| Boarding_Assistance | 2.0 | 2.0 | 0.0 |
| Senior_Travel | 2.0 | 2.0 | 0.0 |
| Baggage_Claim | 0.0 | 0.0 | 1.0 |

From the exemplary matrix shown Table 2, we can determine that Senior Travel and Boarding Assistance always occur together in the training data. Given a much larger set of training samples the counts would be much higher, but it would normalize to the same matrix. Using this matrix, a threshold can be set where any co-occurrences above that threshold will be flagged for human review.

If, for example, two class labels, such as Boarding_Assistance and Senior_Travel, co-occurred more than 80% of the time, the system would collect all samples where they occur together and ask a human to either select some to remove, or add new training samples to the set where only one or the other label occurs. In the case of removal, the system can randomly select a percentage of the samples and remove them automatically or allow the human to choose. For example, in the present example, the combinations of labels that either do not occur together in the training data or co-occur at a much lower frequency than the highest co-occurring labels can be surfaced. For the example in Table 2, the system output would say that two examples of (Baggage_Claim, Boarding_Assistance) co-occurring and two examples of (Baggage_Claim, Senior_Travel) co-occurring should be added to the training data in order to balance out the training data, and therefore remove potential co-occurrence bias.

The second type of bias the system looks for is single class population bias. This type can only occur in single class classification tasks such as sentiment polarity (positive, neutral, negative) or gender conditioned on entertainment preference (love story=>female or war=>male). To detect single class population bias, the system compares the distributions of each value for a given label, e.g., positive, neutral, and negative, for sentiment polarity. If one value is significantly (for example, two orders of magnitude or other appropriate threshold) larger than the other values, the system can determine that the value is over-represented in the training data. In the case of single class bias, the system may recommend to the human user that either a calculated percentage of samples containing that value (e.g., the over-represented sentiment) be removed or more samples from the other values be added. In the case of removal, the system can randomly select a percentage of the samples and remove them automatically or allow the human to choose. If a value has a significantly (for example two orders of magnitude or other appropriate threshold) smaller distribution than the other values, the system may determine that that value is underrepresented in the training data. In this case the system may recommend to the human user that either more samples for that value (e.g., the underrepresented sentiment) be added or a calculated percentage of samples for each of the other values be removed. In the case of removal, the system can randomly select a percentage of the samples and remove them automatically or allow the human to choose. For example, if 70% of output samples have the value of "negative" for the feature of sentiment, the system would recommend adding 20% more samples of "positive" or remove 20% of the existing samples that are "negative".

It may be that the true distribution over such classes in the real population is in fact what is represented in the training data, but the system cannot know this without also knowing the true distribution in the population being modeled. Therefore, it may report such biases to humans to decide if a bias is artificial and should therefore be repaired or is accurate so that it can be ignored. For instance it may be a fact that more males like war movies than females, and therefore such a bias in the training data is representative of reality. In this case the human user would just choose to ignore the flagged bias and continue to the next one.

Once all biases are addressed, the system can allow the model training to continue. That is, the language model can be recompiled according to the training data that has been adjusted for bias according to principles described herein. In this way the resulting models used in the NLU component of the IVA will not contain any latent bias, and any bias existing will be known and approved by the creators.

According to principles described herein, a processor may intake the training data and identify the biases described above. For example, the bias detection methods described herein may be performed prior to the building of a word embedding or lattice model. Performing of such bias detection avoid introducing bias into the resulting models. Thus, preventative preprocessing according to principles described herein reduce the bias that would otherwise exist in downstream models that would have been constructed without preprocessing.

As discussed above, co-occurrence bias is detected by building a co-occurrence matrix of all class labels that exist in the training data, normalizing it, and then looking for co-occurrences that are higher than some threshold of acceptability. In the single class case, associations between features and output classes and if there is an imbalance between all of the possible output classes in the training data are identified. For example if a sentiment classifier is being trained, but there are many more training examples of positive sentiment than negative sentiment, a class imbalance would be introduced into any model trained from that data. Thus, the preprocessing could be performed.

Accordingly, described herein is a system to automatically surface co-occurrence bias in multi-class training data. The system may also automatically surface population bias in single class training data. The system and method search for bias in model training data and may recommend actions to be performed by the human user. The disclosure also provides for an interface to automatically correct bias in training samples if requested by the human user.

Throughout this application, various publications may have been referenced. The disclosures of these publications in their entireties are hereby incorporated by reference into this application in order to more fully describe the state of the art to which this invention pertains.

[1] Robert B Loatman, Stephen D Post, Chih-King Yang, and John C Hermansen. Natural language understanding system, Apr. 3, 1990. U.S. Pat. No. 4,914,590.
[2] Roland Kuhn and Renato De Mori. The application of semantic classification trees to natural language understanding. IEEE transactions on pattern analysis and machine intelligence, 17(5):449{460, 1995.
[3] Pierre Lison. Structured Probabilistic Modelling for Dialogue Management. PhD thesis, University of Oslo, February 2014.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A computer product comprising computer executable code embodied in a non-transitory computer readable medium that, when executing on one or more computing devices performs a method of automatically detecting bias in multi-class training data for training a language model, the method comprising:
   digitally processing training data to identify if the training data comprises co-occurrence bias by:
      building a co-occurrence matrix of all class labels in a given classification task in the training data,
      normalizing entries of class labels in the co-occurrence matrix, and
      identifying normalized entry values in the co-occurrence matrix above a predetermined threshold;
   and
   wherein, if the training data comprises co-occurrence bias, adjusting the training data to compensate for the bias identified by adding examples of class label combinations for entry values below the predetermined threshold until the normalized entries of all class values are above the predetermined threshold.

2. The computer program product of claim 1, wherein the digitally processing the training data comprises scanning the training data with a bias scoring system.

3. The computer program product of claim 1, further comprising flagging for further review by a human reviewer co-occurrence pairs having a number of co-occurrences above the predetermined threshold.

4. The computer program product of claim 1, further comprising digitally processing training data to identify if the training data comprises a class population bias by comparing distribution of a given one of the class labels to a representation threshold value.

5. The computer program product of claim 4, wherein the determination includes one of deeming the co-occurrence or class population bias being artificial requiring repair and deeming the co-occurrence or class population bias being accurate allowing disregarding.

6. The computer program product of claim 4, wherein comprising adjusting the training data comprises adding more samples of an underpopulated label if class population bias is identified.

7. The computer program product of claim 4, wherein adjusting the training data comprises deleting samples of an overpopulated label if class population bias is identified.

8. The computer program product of claim 4, wherein upon identifying class population bias, adjusting the training data comprises adding samples of an underrepresented class labels to the training data.

9. The computer program product of claim 1, further comprising referring detected bias to a human reviewer for further determination of bias.

10. The computer program product of claim 1, further comprising adjusting the training data to compensate for the bias identified by deleting examples of class label combinations for entry values above the predetermined threshold until the normalized entries of all class values are below the predetermined threshold.

11. A method of automatically detecting bias in training data for training a language model, comprising:
- digitally processing training data to identify if the training data comprises co-occurrence bias by:
  - building a co-occurrence matrix of all class labels in a given classification task in the training data,
  - normalizing entries of class labels in the co-occurrence matrix, and
  - identifying normalized entry values in the co-occurrence matrix above a predetermined threshold;
- and
- wherein, if the training data comprises co-occurrence bias, adjusting the training data to compensate for the bias identified by adding examples of class labels for entry values below the predetermined threshold until the normalized entries of all class values are above the predetermined threshold.

12. The method of claim 11, wherein the digitally processing the training data comprises scanning the training data with a bias scoring system.

13. The method of claim 11, further comprising flagging for further review by a human reviewer co-occurrence pairs having a number of co-occurrences above the predetermined threshold.

14. The method of claim 11, further comprising digitally processing training data to identify if the training data comprises a class population bias by comparing distribution of a given one of the class labels to a representation threshold value.

15. The method of claim 14, wherein the determination includes one of deeming the co-occurrence or class population bias being artificial requiring repair and deeming the co-occurrence or class population bias being accurate allowing disregarding.

16. The method of claim 14, wherein comprising adjusting the training data comprises adding more samples of an underpopulated label if class population bias is identified.

17. The method of claim 14, wherein adjusting the training data comprises deleting samples of an overpopulated label if class population bias is identified.

18. The method of claim 14, wherein upon identifying class population bias, adjusting the training data comprises adding samples of an underrepresented class labels to the training data.

19. The method of claim 11, further comprising referring detected bias to a human reviewer for further determination of bias.

20. The method of claim 11, further comprising adjusting the training data to compensate for the bias identified by deleting examples of class label combinations for entry values above the predetermined threshold until the normalized entries of all class values are below the predetermined threshold.

* * * * *